(12) United States Patent (10) Patent No.: US 12,688,067 B2
Yang et al. (45) Date of Patent: Jul. 21, 2026

(54) PROCESSOR RESOURCE ALLOCATION BASED ON RESOURCE ALLOCATION ERROR

(71) Applicant: Tencent Technology (Shenzhen) Company Limited, Shenzhen (CN)

(72) Inventors: Kun Yang, Shenzhen (CN); Cilang Wang, Shenzhen (CN); Xi Tang, Shenzhen (CN); Guangdong Yang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 451 days.

(21) Appl. No.: 18/215,018

(22) Filed: Jun. 27, 2023

(65) Prior Publication Data

US 2023/0342207 A1 Oct. 26, 2023

Related U.S. Application Data

(63) Continuation of application No. PCT/CN2022/132457, filed on Nov. 17, 2022.

(30) Foreign Application Priority Data

Feb. 14, 2022 (CN) .......................... 202210135158.4

(51) Int. Cl.
G06F 9/50 (2006.01)
(52) U.S. Cl.
CPC .................................. G06F 9/5027 (2013.01)
(58) Field of Classification Search
CPC ................ G06F 9/5027; G06F 9/5011; G06F 2209/503; G06F 2209/504; G06F 9/5072; G06F 9/505
See application file for complete search history.

(56) References Cited

U.S. PATENT DOCUMENTS 5,640,563 A * 6/1997 Carmon ................ G06F 9/4887
718/102
6,578,005 B1 * 6/2003 Lesaint .................. G06Q 10/06
705/7.14
(Continued)

FOREIGN PATENT DOCUMENTS

CN 110362407 A 10/2019
CN 111597042 A 8/2020
(Continued)

OTHER PUBLICATIONS

Extended European Search Report and Search Opinion received for European Application No. 22925691.2, mailed on Feb. 24, 2025, 10 pages.
(Continued)

*Primary Examiner* — Benjamin C Wu
(74) *Attorney, Agent, or Firm* — ArentFox Schiff LLP

(57) ABSTRACT

In a method for resource management, a plurality of application processes is received. At least a processor is allocated to the plurality of application processes. For each of the plurality of application processes allocated to the processor, a quantity of remaining available resources for the respective application process in current predetermined resources of the processor is determined. The quantity of remaining available resources is associated with a quantity of remaining available resources for the respective application process in previous predetermined resources of the processor. A resource allocation command for each of the plurality of application processes is determined based on the quantity of remaining available resources for the respective application process in the current predetermined resources. The resource allocation command indicates whether the respective application process is processed.

20 Claims, 8 Drawing Sheets

(56)     References Cited

U.S. PATENT DOCUMENTS

| | | | | |
|---|---|---|---|---|
| 8,375,392 B2* | 2/2013 | Becchi | G06F 9/5044 | |
| | | | 719/318 | |
| 8,424,007 B1* | 4/2013 | Hernacki | G06F 9/485 | |
| | | | 718/103 | |
| 8,555,282 B1* | 10/2013 | Kahn | G06F 9/5094 | |
| | | | 718/100 | |
| 11,200,866 B1* | 12/2021 | Marchya | G09G 5/363 | |
| 2005/0039183 A1* | 2/2005 | Romero | G06F 9/5061 | |
| | | | 718/100 | |
| 2008/0034370 A1* | 2/2008 | Huizenga | G06F 9/5011 | |
| | | | 718/104 | |
| 2012/0060059 A1* | 3/2012 | Johnson | G06F 11/261 | |
| | | | 714/E11.178 | |
| 2013/0339419 A1* | 12/2013 | Emaru | G06F 9/5072 | |
| | | | 709/201 | |
| 2014/0082201 A1* | 3/2014 | Shankari | H04L 41/5025 | |
| | | | 709/226 | |
| 2014/0176583 A1 | 6/2014 | Abiezzi et al. | | |
| 2016/0098292 A1* | 4/2016 | Boutin | G06F 9/4881 | |
| | | | 718/104 | |
| 2017/0109206 A1* | 4/2017 | Wang | G06F 9/4881 | |
| 2017/0300364 A1* | 10/2017 | Liu | G06F 9/5027 | |
| 2017/0357531 A1* | 12/2017 | Zhang | G06F 9/5016 | |
| 2019/0102859 A1* | 4/2019 | Hux | G06T 1/20 | |
| 2019/0121674 A1 | 4/2019 | Chen et al. | | |
| 2020/0026579 A1* | 1/2020 | Bahramshahry | G06F 9/5077 | |
| 2020/0301723 A1* | 9/2020 | Gabrielson | G06F 9/45558 | |
| 2020/0301740 A1* | 9/2020 | Gabrielson | G06F 9/505 | |
| 2020/0301741 A1* | 9/2020 | Gabrielson | G06N 3/0442 | |
| 2021/0026707 A1* | 1/2021 | Rosenberg | G06F 9/5005 | |
| 2021/0173706 A1* | 6/2021 | Wong | G06N 7/01 | |
| 2022/0413941 A1* | 12/2022 | Ramtekkar | G06F 9/5022 | |
| 2023/0305888 A1* | 9/2023 | Zaykov | G06F 9/4887 | |
| 2023/0342207 A1* | 10/2023 | Yang | G06F 9/5011 | |

FOREIGN PATENT DOCUMENTS

| | | | |
|---|---|---|---|
| CN | 112870726 A | 6/2021 | |
| CN | 113849312 A | 12/2021 | |
| CN | 114490082 A | 5/2022 | |

OTHER PUBLICATIONS

International Search Report and Written Opinion received for PCT Patent Application No. PCT/CN2022/132457, mailed on Jan. 18, 2023, 17 pages. (6 pages of English translation and 11 pages of Original Document).

* cited by examiner

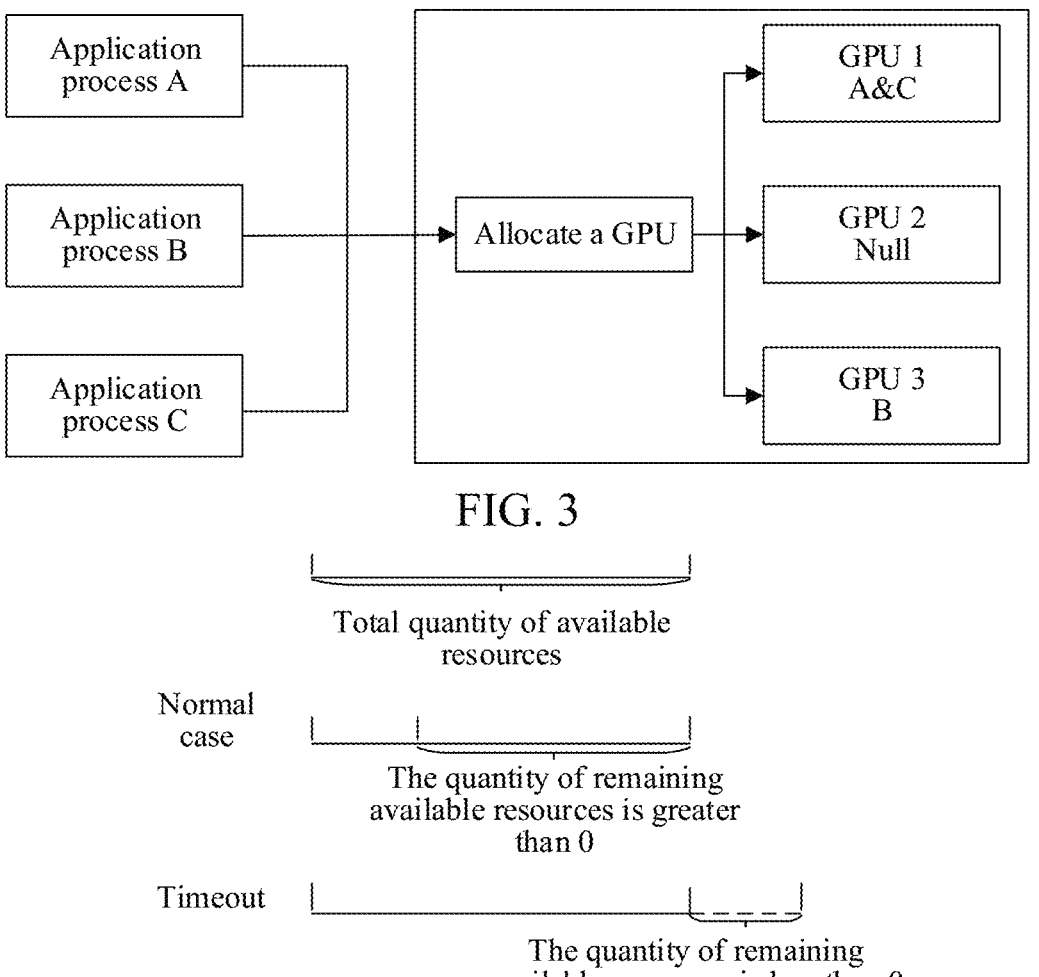
FIG. 3
Total quantity of available
resources
Normal
case
The quantity of remaining
available resources is greater
than 0
Timeout
The quantity of remaining
available resources is less than 0
FIG. 4A
Predetermined resource weights——A: 0.5; B: 0.2; C: 0.3
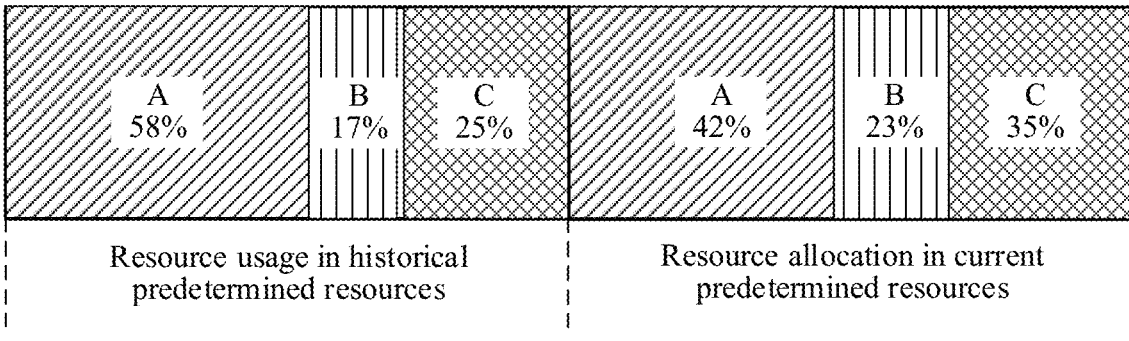
| A 58% | B 17% | C 25% | A 42% | B 23% | C 35% |
Resource usage in historical
predetermined resources
Resource allocation in current
predetermined resources
FIG. 4B

PROCESSOR RESOURCE ALLOCATION BASED ON RESOURCE ALLOCATION ERROR

RELATED APPLICATIONS

The present application is a continuation of International Application No. PCT/CN2022/132457 filed on Nov. 17, 2022, which claims priority to Chinese Patent Application No. 202210135158.4, entitled "GRAPHICS PROCESSING UNIT RESOURCE MANAGEMENT METHOD, APPARATUS, AND DEVICE, AND STORAGE MEDIUM" and filed on Feb. 14, 2022. The entire disclosures of the prior applications are hereby incorporated by reference.

FIELD OF THE TECHNOLOGY

This disclosure relates to the field of cloud technology, including to a graphics processing unit (GPU) resource management method, apparatus, and device, a computer-readable storage medium, and a computer program product.

BACKGROUND OF THE DISCLOSURE

With the continuous development of cloud technology, cloud gaming is more and more popular in the gaming industry. The picture rendering of the cloud gaming is completed on a GPU at a cloud server, and a rendering result is transmitted to a client of a user through a network. However, since the cloud server has limited GPU resources and a plurality of game processes carried on the cloud server may share hardware computing resources of the cloud server in the cloud server providing the cloud gaming, access to the hardware computing resources may become contentious. If a plurality of game processes are simultaneously run on one GPU, the game processes contend for GPU resources to affect the rendering effect. If a separate GPU is provided for each game process, the GPU resources will be wasted although the rendering quality of each game process can be guaranteed.

Therefore, an efficient GPU resource management method is required to realize higher-quality multi-game process rendering with limited GPU resources.

SUMMARY

In order to address the foregoing problem, a processing order of task processes may be determined in real time according to resource requirements of the task processes and the resource consumption already generated thereby, so as to achieve more efficient allocation of graphics manager resources.

This disclosure includes embodiments for resource management, including providing a GPU resource management method, apparatus, and device, a non-transitory computer-readable storage medium, and a computer program product.

This embodiment of this disclosure provides a method for resource management. In the method for resource management, a plurality of application processes is received. At least a processor is allocated to the plurality of application processes. For each of the plurality of application processes allocated to the processor, a quantity of remaining available resources for the respective application process in current predetermined resources of the processor is determined. The quantity of remaining available resources is associated with a quantity of remaining available resources for the respective application process in previous predetermined resources of the processor. A resource allocation command for each of the plurality of application processes is determined based on the quantity of remaining available resources for the respective application process in the current predetermined resources. The resource allocation command indicates whether the respective application process is processed.

This embodiment of this disclosure further provides a method for resource management. In the method for resource management, a scheduling process is started. The scheduling process includes an allocation thread and a plurality of processing threads. A plurality of processors configured to process a plurality of application processes through the allocation thread is determined. Each of the plurality of threads is allocated to a respective one of the plurality of processors. The plurality of application processes is started. Each of the plurality of application processes includes a scheduling library pre-configured by the scheduling process. For each of the plurality of application processes, one processor in the plurality of processors and the processing thread corresponding to the one processor is allocated to the respective application process through the scheduling library of the respective application process and the allocation thread. For each of the plurality of application processes allocated to a processor of the plurality of processors, a resource allocation command is determined based on a quantity of remaining available resources for the respective application process in current predetermined resources of the processor. The resource allocation command indicating whether the respective application process is processed. The quantity of remaining available resources being associated with a quantity of remaining available resources for the respective application process in previous predetermined resources of the processor.

This embodiment of this disclosure provides a resource management apparatus, including processing circuitry. The processing circuitry is configured to receive a plurality of application processes. The processing circuitry is configured to allocate at least a processor to the plurality of application processes. The processing circuitry is configured to determine, for each of the plurality of application processes allocated to the processor, a quantity of remaining available resources for the respective application process in current predetermined resources of the processor. The quantity of remaining available resources is associated with a quantity of remaining available resources for the respective application process in previous predetermined resources of the processor. The processing circuitry is configured to determine a resource allocation command for each of the plurality of application processes based on the quantity of remaining available resources for the respective application process in the current predetermined resources. The resource allocation command indicates whether the respective application process is processed.

This embodiment of this disclosure provides a resource management device, including: one or more processors; and one or more memories, the one or more memories storing computer-executable programs, the computer-executable programs, when executed by the processor, performing any of the methods as described above.

This embodiment of this disclosure provides a non-transitory computer-readable storage medium, storing instructions which when executed by a processor cause the processor to perform any of the methods as described above.

This embodiment of this disclosure provides a computer program product or a computer program. The computer program product or the computer program includes computer instructions. The computer instructions are stored in a computer-readable storage medium. A processor of a computer device reads the computer instructions from the computer-readable storage medium. The processor executes the computer instructions, whereby the computer device performs any of the method according to this embodiment of this disclosure.

Compared with a related GPU resource management method, the method provided in this embodiment of this disclosure can use resource consumption of an application process running on a GPU in the past as a reference for resource allocation, so as to adjust resource allocation in real time according to a quantity of resources actually available to each application process, thereby avoiding resource contention in a plurality of application processes.

According to a method provided in this embodiment of this disclosure, in view of remaining available resources of application processes simultaneously running on the same GPU in historical resource allocation, a resource allocation scheme is determined in real time based on a quantity of resources currently available for the application processes in resources of the GPU, so as to realize efficient allocation of graphics manager resources. By using the method provided herein, GPU resources can be reasonably allocated according to resource requirements of application processes, thereby avoiding the influence of contention in multiple application processes, and improving the utilization rate of the GPU resources.

BRIEF DESCRIPTION OF THE DRAWINGS

In order to describe the technical solutions of the embodiments of this disclosure more clearly, the following briefly introduces the accompanying drawings. The accompanying drawings in the following description show only some exemplary embodiments of this disclosure.

FIG. 3 shows a schematic diagram of allocating GPUs to a plurality of application processes according to an embodiment of this disclosure.

FIG. 4A shows a schematic diagram of two resource usage situations according to an embodiment of this disclosure.

FIG. 4B shows a schematic diagram of a resource allocation proportion for a plurality of application processes according to an embodiment of this disclosure.

DESCRIPTION OF EMBODIMENTS

Figure 1:
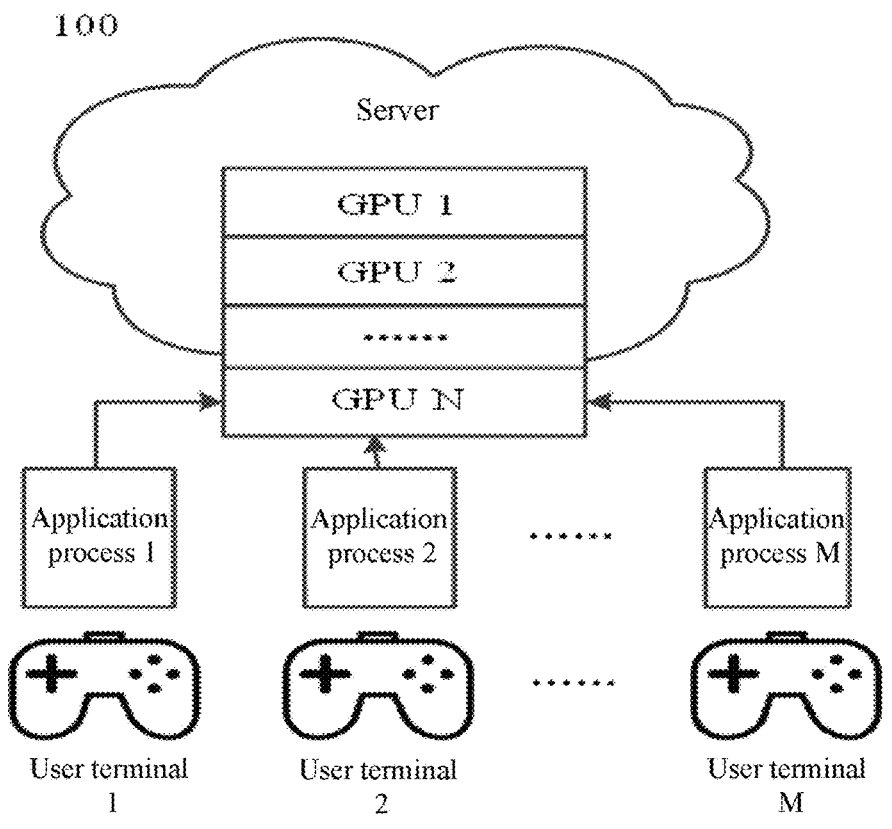
FIG. 1 shows a schematic example diagram of a scene in which a plurality of application processes use GPU resources according to an embodiment of this disclosure.

To make the objects, technical solutions, and advantages of this disclosure more apparent, exemplary embodiments according to this disclosure will be described in further detail below with reference to the accompanying drawings. The described embodiments are merely some but not all of the embodiments of this disclosure. It should be understood that, this disclosure is not limited by the exemplary embodiments described herein.

In this disclosure and drawings, substantially the same or similar steps and elements are denoted by the same or similar reference numerals, and repeated description of the steps and elements will be omitted. Also, in the description of this disclosure, the terms "first", "second", and the like are used for descriptive purposes only and are not to be construed as indicating or implying relative importance or ordering. Furthermore, the term "plurality" may be understood as at least two.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

Unless otherwise defined, meanings of all technical and scientific terms used in this disclosure are the same as those understood by a person skilled in the art to which this disclosure belongs. The terms used in this disclosure are for the purpose of describing the embodiments of the present disclosure only and are not intended to be limiting of the present disclosure.

A GPU resource management method of this disclosure may be based on cloud technology.

The GPU resource management method of this disclosure may be based on cloud gaming.

FIG. 1 shows a schematic example diagram of a scene in which a plurality of application processes use GPU resources according to an embodiment of this disclosure.

Currently, many mobile phone applications or computer software are required to be networked to perform the functions thereof, especially for gaming applications. The network may be an Internet of Things based on the Internet and/or a telecommunication network, and may be a wired network or a wireless network. For example, the network may be a local area network (LAN), a metropolitan area network (MAN), a wide area network (WAN), a cellular data communication network, or an electronic network capable of performing an information exchange function. As shown in FIG. 1, a mobile phone application or computer software on a user terminal may transmit a control command inputted by a user to a server, so as to start an application process corresponding thereto. There may be a variety of hardware computing resources on the server, for example, a CPU, a communication interface, a memory, and the like. Taking GPU resources shown in FIG. 1 as an example, the server is provided with a plurality of GPUs (for example, GPU-1, GPU-2, and the like). Each GPU in the GPUs may perform related computations for different application processes.

The server may be an independent physical server, may also be a server cluster or distributed system including a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a large data and artificial intelligence platform. The user terminal may be a smartphone, a tablet computer, a laptop computer, a desktop computer, a smart speaker, a smartwatch, or the like, but is not limited thereto. The user terminal and the server may be directly or indirectly connected in a wired or wireless communication manner. This disclosure is not limited herein. For example, in this embodiment of this disclosure, networked gaming applications, which may also be referred to as cloud gaming (also referred to as "game-on-demand"), typically rely on GPUs on a cloud server to synthesize a game picture to be displayed by the user terminal or to perform hardware coding. The user terminal may transmit data of user operating games to the cloud server through a control stream, and the cloud server transmits one or more audio frames and video frames to the user terminal through a data stream.

In cloud gaming, a game may be stored, synchronized, and presented in a remote cloud server, and delivered to a player using a streaming technology, which is an online gaming service different from the past. For example, the cloud server runs the game, presents and codes the graphical output into video, and then streams the video to a network client. The network client decodes and displays a video stream for interaction between a player and the game while transmitting a control command inputted by the player to the cloud server. In the cloud gaming, the computing load of the game is transferred from the client to the cloud in such a way as to relieve constraints on a player device. Furthermore, the cloud gaming allows the player to start the game immediately without time consumption in downloading and installation of the game client. Due to these advantages, the cloud gaming has attracted a great deal of academic and industrial attention.

As described above, the cloud server is responsible for interpretation of player input, execution of game code, rendering of graphics, and transmission of game scenes to the client through the network, while the client is responsible for decoding and displaying the game scenes to the player, and capturing and transmitting operations of the game player on the game in real time and as input by the cloud server. In the process of performing graphics rendering by the cloud server using a GPU, since GPU hardware computing resources are limited and a plurality of virtual entities carried on the cloud server may share hardware computing resources of the cloud server in the cloud server providing the cloud gaming, access to the hardware computing resources may become contentious. In general, by the rendering of GPU hardware, rendering requests provided to all the game processes thereon are processed on a first-come, first-render principle, and the rendering load increase of a single game process may affect the normal rendering of other game processes. For example, in a case of rendering timeout of any game process, other game processes are forced to shorten the rendering time, resulting in poor rendering quality, and the degradation of rendering quality may gradually accumulate as the rendering process progresses, thereby seriously affecting the game experience of users.

In current GPU resource management methods, isolated and in some cases completely isolated resource allocation is selected in the management of GPU resources, or resource preemption is indulged, which does not isolate the bandwidth of GPU memory and a peripheral component interconnect express (PCI-E) bus, which may result in a high occupancy rate of the GPU at a certain moment, while the PCI-E bus is in an idle state, resulting in a low utilization rate of the overall resources. The partitioning of GPU resources by technologies such as GPU virtualization can only achieve one-half or one-quarter of the partitioning granularity of GPU resources, but more fine-grained resource partitioning cannot be achieved. Such resource management methods rely on pre-configuration for specific application processes, and cannot allocate GPU computing resources to application processes flexibly in real time according to the entry and exit thereof.

Based on this, this disclosure provides a GPU resource management method, which determines a processing order of task processes in real time according to resource requirements of the task processes and the resource consumption already generated thereby, so as to achieve efficient allocation of graphics manager resources.

Compared with a related GPU resource management method, the method provided in this embodiment of this disclosure uses resource consumption of an application process running on a GPU in the past as a reference for resource allocation, so as to adjust resource allocation in real time according to a quantity of resources actually available to each application process, thereby avoiding resource contention in a plurality of application processes.

According to the method provided in this embodiment of this disclosure, in view of remaining available resources of application processes simultaneously running on the same GPU in historical resource allocation, a resource allocation scheme is determined in real time based on a quantity of resources currently available for the application processes in resources of the GPU, so as to realize efficient allocation of graphics manager resources. By using the method provided herein, GPU resources can be allocated according to resource requirements of application processes, thereby avoiding the influence of contention in multiple application processes, and improving the utilization rate of the GPU resources.

Figure 2A:
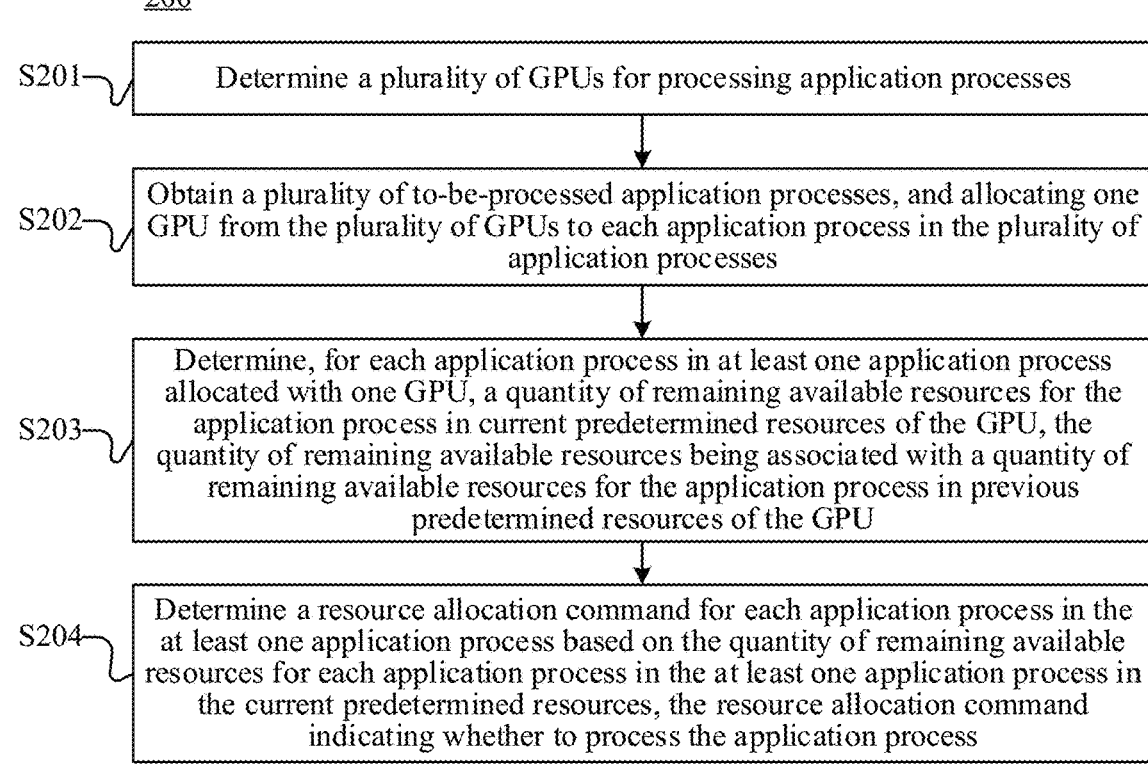
FIG. 2A shows a flowchart of a GPU resource management method according to an embodiment of this disclosure.
Figure 2B:
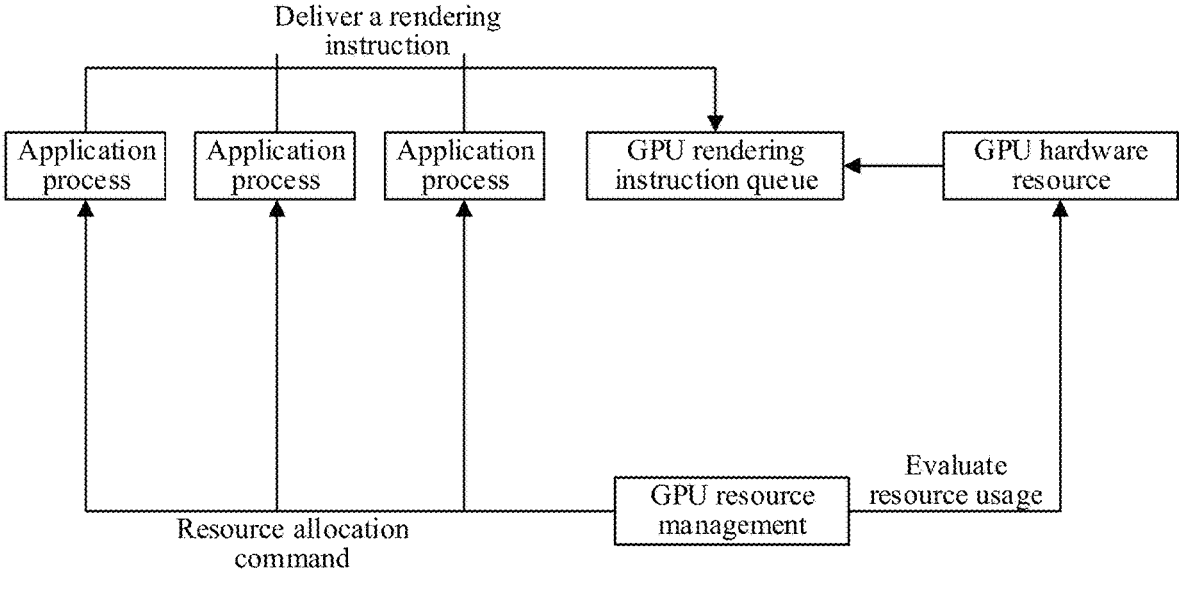
FIG. 2B shows a schematic flowchart of a GPU resource management method according to an embodiment of this disclosure.
Figure 2C:
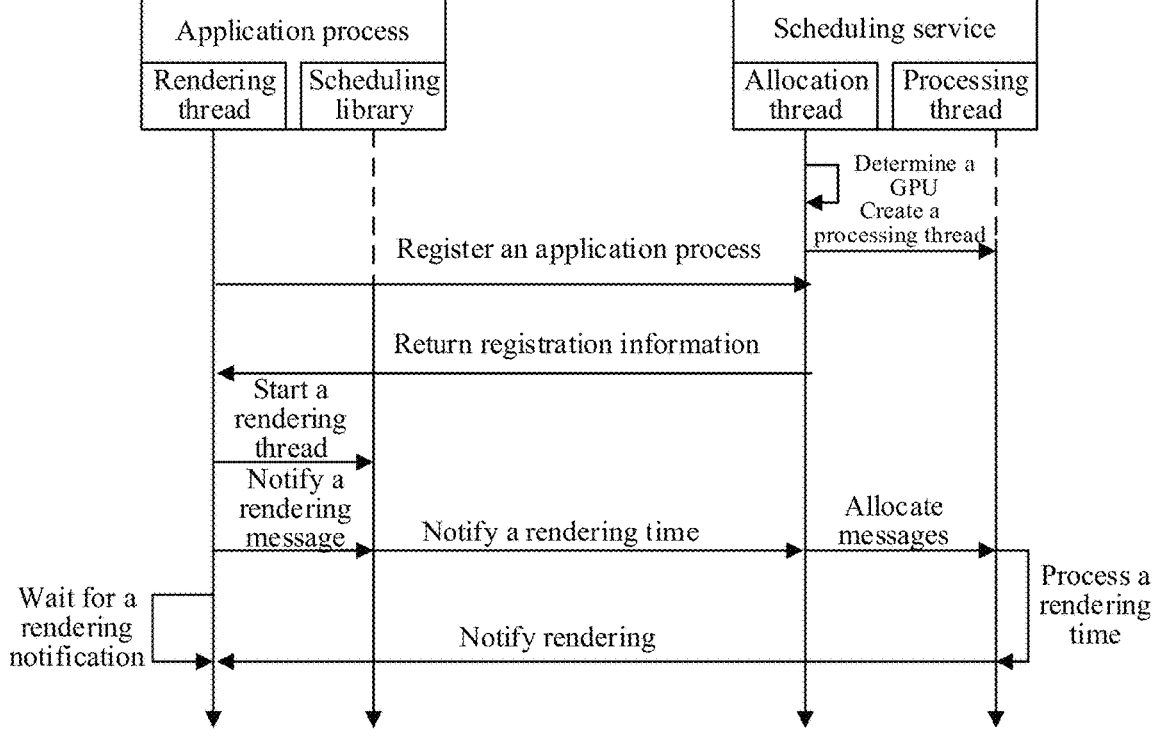
FIG. 2C shows a schematic timing diagram of a GPU resource management method according to an embodiment of this disclosure.

FIG. 2A shows a flowchart of a GPU resource management method 200 according to an embodiment of this disclosure. FIG. 2B shows a schematic flowchart of a GPU resource management method according to an embodiment of this disclosure. FIG. 2C shows a schematic timing diagram of a GPU resource management method according to an embodiment of this disclosure.

As shown in FIG. 2A, in step S201, a plurality of GPUs for processing application processes may be determined.

GPU resource management may be performed in conjunction with an application process and a scheduling service as shown in FIG. 2C. The application process portion corresponds to operations performed by an application process (for example, a game instance) during GPU resource management, and the scheduling service portion corresponds to GPU resource management scheduling operations for the corresponding application process. The application process may be various application processes such as a game process, a video process, and a conference process. The game process developed through a graphics engine such as an open graphics library (OpenGL) is described in this disclosure as an example without limitation, and any process requiring GPU resource scheduling may be applicable to the GPU resource management method of this disclosure.

As shown in FIG. 2C, before the application process is started, an allocation thread in the scheduling service may first determine a plurality of GPUs currently available for processing the application process, corresponding processing threads are created for the GPUs in the scheduling service, and subsequent resource allocation management for each GPU may be performed on the corresponding processing thread. For example, a GPU determined for a graphics rendering task of an application process such as a game instance is required to have a certain rendering computation capability. It is to be understood that although the graphics rendering of the game instance in a cloud gaming scene is described below in many cases, the GPU resource management method of this disclosure is equally applicable to the processing of other application processes, for example, to the processing of the video process and the conference process. Further, the resource management can be applied to other processors, and should not be understood to be limited to GPUs. The processing may be either image rendering of a video picture or image rendering of a conference picture.

In step S202, a plurality of to-be-processed application processes may be obtained, and one GPU may be allocated from the plurality of GPUs to each application process in the plurality of application processes.

As shown in FIG. 2C, when user terminals start applications, a server may register corresponding application processes for the applications, including, but not limited to, allocation of GPUs to the application processes for graphics rendering processing thereof and return of registration information thereof to the application processes, such as indexes of the allocated GPUs and corresponding processing threads.

In a case that GPU resource requirements of the application process exceed the determined available resources of each GPU, the request of the application process for the GPU resources may also be forwarded to be executed on different GPUs, whereby a plurality of GPUs may be virtualized as one GPU to realize the application process processing in this case.

In a case of ensuring that the computing performance limitations of the GPUs are met, more than one application process may be allocated to the same GPU. That is, processing tasks of more than one application process are executed simultaneously on the same GPU.

FIG. 3 shows a schematic diagram of allocating GPUs to a plurality of application processes according to an embodiment of this disclosure. As shown in FIG. 3, in the presence of three application processes A, B, and C and three available GPUs 1, 2, and 3, by performing the operation of allocating GPUs in step S202, application processes A and C are allocated to GPU 1 for processing, application process B is allocated to GPU 2 for processing, and GPU C may not be allocated to perform the processing of any application process. Therefore, application processes A and C running together on GPU 1 may share computing resources on GPU 1, and therefore resource usage of the application processes may also have a contention relationship. The GPU resource management method of this disclosure can avoid the contention influence between the application processes.

According to this embodiment of this disclosure, each application process in the plurality of application processes may have a predetermined resource requirement weight. The resource requirement weight of each application process may be determined based on the quantity of GPU resources required for computing the resource requirement weight, which may be predetermined and notified to the scheduling service upon registration. For example, for a plurality of game instances, corresponding resource requirement weights may be predetermined based on the complexity of picture rendering and the computation quantity. The weight may be a proportion of the picture rendering of the game instance in a unit of GPU resources. For example, in a case that the picture rendering of the game instance requires 200 ms in GPU hardware computation time of 1 s. The resource requirement weight of the game instance may be 0.2 (200 ms/1 s).

According to this embodiment of this disclosure, the operation of allocating one GPU from the plurality of GPUs to each application process in the plurality of application processes in step S202 may include: determining an available resource proportion of each GPU in the plurality of GPUs, the available resource proportion being a proportion of resources available for processing the application process in the GPU; and determining a GPU allocated to each application process based on the resource requirement weight of each application process in the plurality of application processes and the available resource proportion of each GPU in the plurality of GPUs.

As described above, each GPU in the plurality of GPU is a GPU currently available for processing application processes, but the quantity of available computing resources in the GPUs is not necessarily equal and not necessarily equal to the total quantity of computing resources thereof. Therefore, the quantity of available resources of the available GPUs needs to be determined before allocating a GPU to an application process having a specific resource requirement. Similar to the above description regarding the resource requirement weight, the quantity of available resources of the GPU may be represented by an available resource proportion thereof. The available resource proportion may represent a proportion of resources available for processing application processes in the GPU in unit resources thereof. For example, if the time available for processing application processes is 0.8 s in the GPU hardware computation time of 1 s, and the available resource proportion of the GPU may be 0.8.

Therefore, the GPU allocation to application processes may be jointly determined based on the resource requirement weight of each application process and the available resource proportion of each GPU. According to this embodiment of this disclosure, the sum of the resource requirement weights of at least one application process allocated with one GPU being not greater than the available resource proportion of the GPU. The sum of resource requirement weights of application processes allocated for processing on one GPU may not be greater than the available resource proportion of the GPU. That is, the quantity of resources in the GPU actually used for processing the application processes may not be greater than an expected quantity of resources.

In step S203, for each application process in at least one application process allocated with one GPU, a quantity of remaining available resources for the application process in current predetermined resources of the GPU may be determined. The quantity of remaining available resources may be associated with a quantity of remaining available resources for the application process in historical predetermined resources of the GPU. According to this embodiment of this disclosure, quantities of resources contained in the historical predetermined resources and the current predetermined resources of the GPU may both be a predetermined resource quantity.

The resources (namely, predetermined resources) contained in the historical predetermined resources and the current predetermined resources may be the unit GPU resources as described above. The historical predetermined resources are resources predetermined for the application process before the current predetermined resources. The usage quantity of the unit GPU resources may be used for determining a usage rate of the GPU (ratio of the actual working time to the running time of the GPU), and therefore the resource allocation of the GPU in this disclosure may be based on the allocation of the unit GPU resources. For example, the unit GPU resources may be a unit length of computation time, such as 1 s or 1 frame time described above. This disclosure is not limited thereto. According to this embodiment of this disclosure, the resource requirement weight of each application process in the plurality of application processes may indicate a proportion of a required resource quantity of the application process in the predetermined resource quantity. As described above, the resource requirement weight of the application process may be a proportion of resources required in the unit GPU resources for processing the application process.

In this embodiment of this disclosure, the current resource allocation may be determined based on a historical state of the resource allocation to the application process. The historical state may include the quantity of remaining resources for the application process in the historical resource allocation, namely the quantity of resources available and not used thereby. In the presence of the quantity of remaining available resources, resources of the application process may be occupied due to processing timeout of other application processes. Such resource occupation may result in a poor rendering effect of the application process. Therefore, in order to avoid accumulation of such resource occupation, corresponding adjustment may be performed in subsequent resource allocation. For example, the quantity of available resources of the application process in the current resource allocation is associated with the quantity of remaining available resources thereof in the historical resource allocation.

According to this embodiment of this disclosure, the operation of determining a quantity of remaining available resources for the application process in current predetermined resources in step S203 may include: determining the quantity of remaining available resources for the application process in the current predetermined resources based on the quantity of remaining available resources for the application process in the historical predetermined resources, the quantity of used resources for the application process in the current predetermined resources, and the resource requirement weight of the application process.

The total quantity of available resources for the application process in the current predetermined resources may be determined based on the resource requirement weight of the application process and the quantity of remaining available resources in the historical predetermined resources. Therefore, on this basis, the quantity of remaining available resources for the application process in the current predetermined resources may be determined according to the quantity of used resources for the application process in the current predetermined resources. That is, the quantity of remaining available resources in the current predetermined resources may be obtained by subtracting the quantity of resources used in the current predetermined resources from the total quantity of available resources in the current predetermined resources.

By determining the quantity of remaining available resources for the application process in the current predetermined resources based on the quantity of remaining available resources in the historical predetermined resources, a current resource allocation may be adjusted based on an error in a historical resource allocation, so as to reduce or even eliminate the resource allocation error. For example, in a case that the quantity of remaining available resources for the application process in the historical predetermined resources is less than zero, the resource allocation error may be effectively reduced by subtracting an absolute value of the quantity of remaining available resources for the application process in the historical predetermined resources from the quantity of remaining available resources for the application process in the current predetermined resources.

Therefore, according to this embodiment of this disclosure, the GPU resource management method 200 may further include: obtaining, for each application process in the at least one application process, a quantity of remaining available resources for the application process in the historical predetermined resources, and determining a quantity of used resources for the application process in the current predetermined resources.

The quantity of used resources for the application process in the current predetermined resources may include a quantity of resources used by the application process in a previous resource allocation and a quantity of resources used in an earlier resource allocation to the current predetermined resources. The quantity of resources used by the application process in the previous resource allocation corresponds to computing resources used thereby in the latest processing.

Therefore, the operation of determining the quantity of used resources for the application process in the current predetermined resources may include: determining a first increment of the quantity of used resources for the application process in the current predetermined resources. The first increment may correspond to previous processing of the processing task from the application process by the GPU corresponding to the application process.

For a rendering task of a game instance, the first increment may correspond to time when the GPU previously renders the game instance. As shown in FIG. 2C, the rendering time may be obtained by the application process and notified to a scheduling service through a scheduling library disposed therein, whereby the scheduling service processes the rendering time based on the rendering time, including determining the quantity of remaining available resources for the application process in the current predetermined resources.

As described above, the scheduling service may jointly determine a current resource allocation scheme by determining the quantity of remaining available resources for each application process on the same GPU in the current predetermined resources, and the application process is notified whether to render. During this period, the application process waits for a rendering notification from the scheduling service, as shown in FIG. 2C. Therefore, it is important for the GPU resource management of this disclosure to obtain the quantity of remaining available resources for each application process, and in particular to obtain the first increment of each application process, so as to effectively reduce the allocation error. The first increment may be obtained with reference to the following description for FIG. 6 and FIG. 7. The detailed description will be omitted herein.

In step S204, a resource allocation command for each application process in the at least one application process may be determined based on the quantity of remaining available resources for each application process in the at least one application process in the current predetermined resources. The resource allocation command indicates whether to process the application process.

According to this embodiment of this disclosure, step S204 may include: determining that the resource allocation command for the application process indicates non-processing of the application process in a case that the quantity of remaining available resources for each application process in the at least one application process in the current predetermined resources is not greater than zero; and determining, for other application processes having more than zero remaining available resources in the at least one application process, the resource allocation command for each application process based on a priority of each application process in the other application processes.

As described above, resources may no longer be allocated to application processes, having no more than zero remaining available resources in the current predetermined resources, in the current predetermined resources, so as not to affect the processing of other application processes. It may be considered to continue allocating GPU computing resources to application processes having more than zero remaining available resources in the current predetermined resources. The resource allocation to the application processes may be based on priorities of the application processes, not just on a first-come, first-process contention pattern described previously.

According to this embodiment of this disclosure, the priority of each application process in the other application processes may be associated with a time length in which the application process waits to be processed and a time order in which the latest first increment thereof is determined. For example, a to-be-processed application process to be in a situation such as picture blocking may be in a higher priority for preferential processing. The priorities of application processes without such an emergency may be determined based on the time order in which the first increments of the application processes are obtained. For example, application processes which first obtain the first increments and have more than zero remaining available resources in the current predetermined resources may be preferentially processed.

According to this embodiment of this disclosure, the operation of determining the resource allocation command for each application process based on a priority of each application process in the other application processes may include: determining, for each application process in the other application processes, the resource allocation command for each application process based on the time order in which the latest first increment of the application process is determined in the presence of an application process waiting to be processed in a time length satisfying a predetermined condition; and determining, in the absence of the application process waiting to be processed in the time length satisfying the predetermined condition, the resource allocation command for each application process based on the time order in which the latest first increment of each application process in the other application processes is determined.

As described above, the priorities of application processes may be set in consideration of, including but not limited to, the following factors: (1) quantity of remaining available resources, where a low priority (indicating non-execution) may be set for an application process having no more than zero remaining available resources in the current predetermined resources; (2) emergency, where a high priority may be allocated to an application process to be urgently processed currently, such as displayed picture blocking or other emergencies; and (3) first increment obtaining order, where a higher priority may be allocated to an application process of which the first increment is obtained first, whereby GPU resource allocation is more continuous, thereby increasing the usage rate of GPU resources. It is to be understood that the method of this disclosure may also consider various other factors in setting the processing priorities of application processes. The above factors are presented herein by way of example and not limitation.

According to this embodiment of this disclosure, the resource allocation command indicates whether a corresponding application process transmits a processing task to a corresponding GPU to be processed by the GPU. The processing of the processing task by the GPU corresponds to the use of resources of the GPU by the application process.

As described above, the foregoing various operation steps may be performed in an event-triggered manner without redirecting rendering instructions of all application processes to an instruction flow system necessary for rendering the scheduling process, thereby improving development efficiency and reducing costs.

As shown in FIG. 2B, the GPU resource management of this application controls the transmission of processing tasks by various application processes by evaluating the resource usage of the GPU hardware resources by the application processes. Taking graphics rendering tasks as an example in FIG. 2B, GPU resource management may control the delivery of rendering instructions by various application processes through resource allocation commands.

Each application process may determine, according to the received resource allocation command, whether to transmit a processing task to the corresponding GPU (for example, delivering a rendering instruction to a GPU rendering instruction queue in FIG. 2B), and execution of the application process by the GPU will consume a quantity of GPU hardware resources. The quantity of GPU hardware resources may correspond to a first increment of the application process referenced in a next resource allocation.

According to this embodiment of this disclosure, the resource allocation command may enable the quantity of remaining available resources for the application process in the current predetermined resources to reach a preset target value. The resource allocation command may tend to reduce the error in resource allocation to the application processes. The preset target value is a preset value required to be reached by the quantity of remaining available resources, and may be set as required. For example, the preset target value may be set as zero, whereby the quantity of remaining available resources approaches zero, so as to save resources.

FIG. 4A shows a schematic diagram of two resource usage situations according to an embodiment of this disclosure. For example, in a case that the quantity of remaining available resources for an application process is greater than zero (for example, a normal case as shown in FIG. 4A), a resource allocation command to the application process enables the application process to transmit a processing task, and then a certain quantity of computing resources are used, whereby the quantity of remaining available resources greater than zero is reduced. However, in a case that the quantity of remaining available resources for an application process is less than zero (for example, timeout as shown in FIG. 4A), the application process can no longer use any resources in the current predetermined resources, and therefore no more resources are allocated for the application process in the current predetermined resources, whereby the quantity of remaining available resources does not continue to be reduced.

According to this embodiment of this disclosure, the resource allocation command enables a proportion of resources used by an application process in the current predetermined resources to be closer to a resource requirement weight of the application process than a proportion of resources used by the application process in the historical predetermined resources. The resource allocation command enables a first error of the application process to be greater than a second error. The first error is an error between the resource requirement weight of the application process and a proportion of resources used by the application process in the historical predetermined resources. The second error is an error between the resource requirement weight of the application process and a proportion of resources used by the application process in the current predetermined resources.

FIG. 4B shows a schematic diagram of a resource allocation proportion for a plurality of application processes according to an embodiment of this disclosure. As shown in FIG. 4B, the resource requirement weights of three application processes A, B, and C are 0.5, 0.2, and 0.3. In the historical predetermined resources, application process A uses a quantity of resources (58%) exceeding the predetermined resource requirement thereof, resulting in resource shortage of the other two application processes B and C (17% and 25%, both being less than resource proportions corresponding to the predetermined resource requirements thereof).

Therefore, according to the GPU resource management method of this disclosure, the quantity of remaining available resources for application process A in the historical predetermined resources is less than zero (for example, −0.08 in the example of FIG. 4B), and the resource allocation thereof is required to be reduced in the current predetermined resources according to the quantity (namely, 0.08) of resources used by application process A excessively. Therefore, in the resource allocation result of the current predetermined resources, 42% of available resources are allocated to application process A by resource allocation adjustment, while resource compensation is performed on application processes B and C of other occupied resources according to the quantity (namely, the quantity of available resources for application process B is 20%+(20%−17%)

=23%, and the quantity of available resources for application process C is 30%+(30%−25%)=35%).

By enabling the quantity of remaining available resources for the application process in the current predetermined resources to reach the preset target value as described above, the quantity of resources used by the application process in the current predetermined resources is closer to an expected quantity of resources, namely, a resource requirement quantity corresponding to a resource requirement weight thereof. Therefore, on-demand resource allocation to application processes and efficient utilization of GPU resources can be achieved.

Considering that a precise timer may be required to be bound for the processing thread to trigger timing allocation for GPU hardware resources, a rendering time notification operation and a rendering time processing operation in FIG. 2C are completed by creating an acquisition queue and a processing queue for acquiring and processing a rendering time, in order to reduce the complexity of the method.

Figures 5, 6:
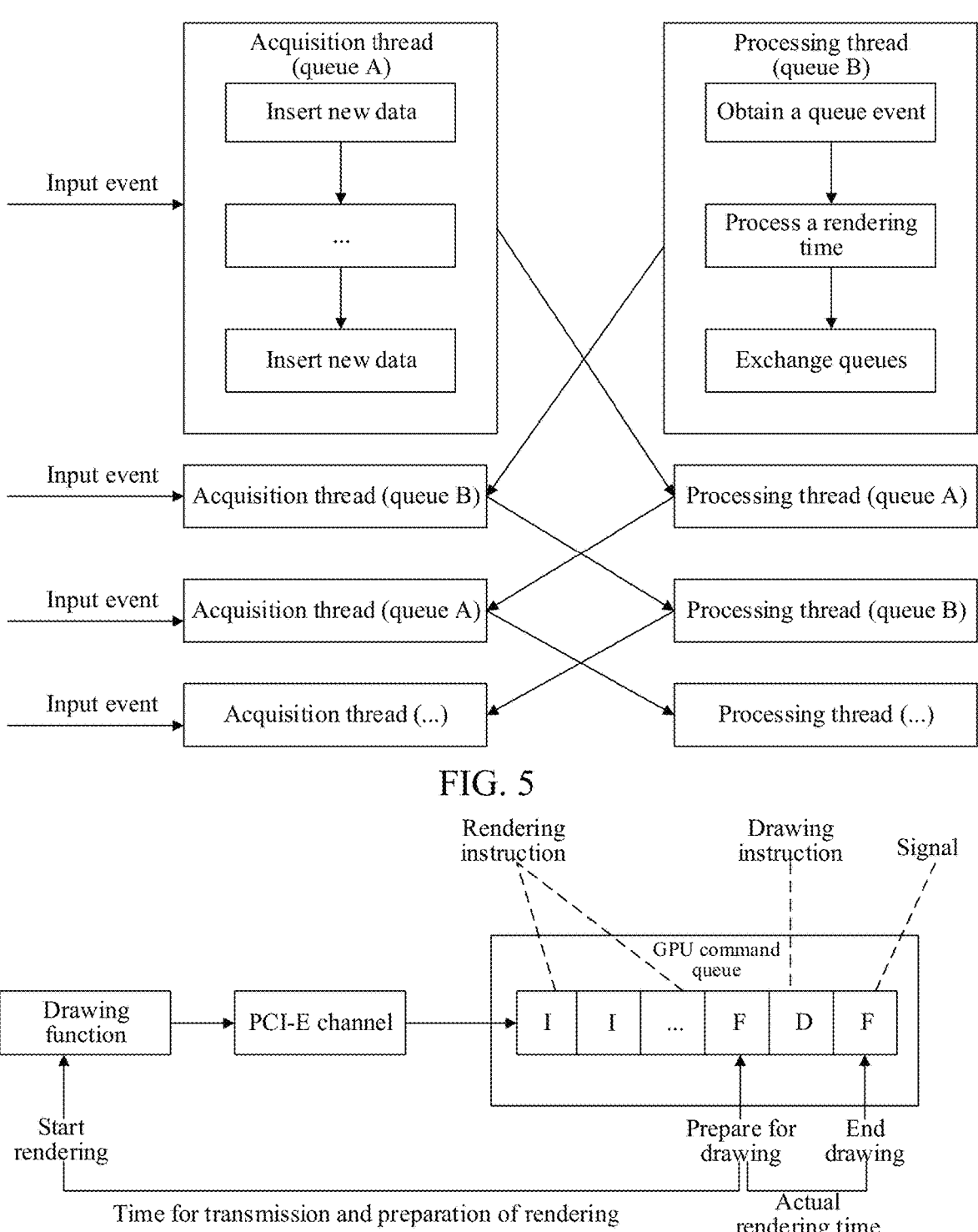
FIG. 5 shows a schematic diagram of an acquisition queue and a processing queue according to an embodiment of this disclosure.
FIG. 6 shows a schematic diagram of an example in which a first increment of a quantity of used resources of an application process in current predetermined resources is determined according to an embodiment of this disclosure.

FIG. 5 shows a schematic diagram of an acquisition queue and a processing queue according to an embodiment of this disclosure. As shown in FIG. 5, the acquisition queue sequentially inserts a plurality of new rendering time data via an input event. The processing queue performs rendering time processing during this period, and may be exchanged with the acquisition queue after the processing is completed, whereby the acquisition queue becomes a new processing queue, and the processing queue becomes a new acquisition queue. The timing allocation is realized via the alternation of the queues.

During the acquisition of the rendering time, the manner in which the first increment is obtained may also change depending on the rendering manner of the application process. According to this embodiment of this disclosure, the manner in which the first increment is obtained may be determined based on a manner of processing the processing task by the GPU. The manner of processing may include at least one of synchronous rendering or asynchronous rendering.

According to this embodiment of this disclosure, the operation of determining a first increment of the quantity of used resources for the application process in the current predetermined resources may be performed by one of the following: estimating the first increment by marking the start and end of the previous processing; or obtaining the first increment from the GPU by using a query instruction.

The first increment may be determined by intercepting a GPU hardware queue via signals in the asynchronous rendering manner. In this case, according to this embodiment of this disclosure, the operation of determining a first increment of the quantity of used resources for the application process in the current predetermined resources may be: estimating the first increment by marking the start and end of the previous processing.

FIG. 6 shows a schematic diagram of an example in which a first increment of a quantity of used resources of an application process in current predetermined resources is determined according to an embodiment of this disclosure.

The actual time consumption of rendering may be determined by calculating time in which a drawing function is performed, and the actual time consumption of rendering is taken as the first increment of the quantity of used resources in the current predetermined resources. As shown in FIG. 6, the time in which the drawing function is performed may include a preparation time and an actual rendering time. In the preparation time, transmission of the drawing function through a PCI-E channel and preparation of rendering are performed, including execution of a rendering instruction. The actual rendering time is actually a drawing instruction execution portion. Therefore, an instruction signal F may be inserted before and after the drawing instruction to notify the application process (or the scheduling service) to start timing or end timing when the signal F is triggered.

The first increment may be determined by querying locally in the application thread in the synchronous rendering manner. In this case, according to this embodiment of this disclosure, the operation of determining a first increment of the quantity of used resources for the application process in the current predetermined resources may be: obtaining the first increment from the GPU by using a query instruction.

Figures 7, 8A, 8B:
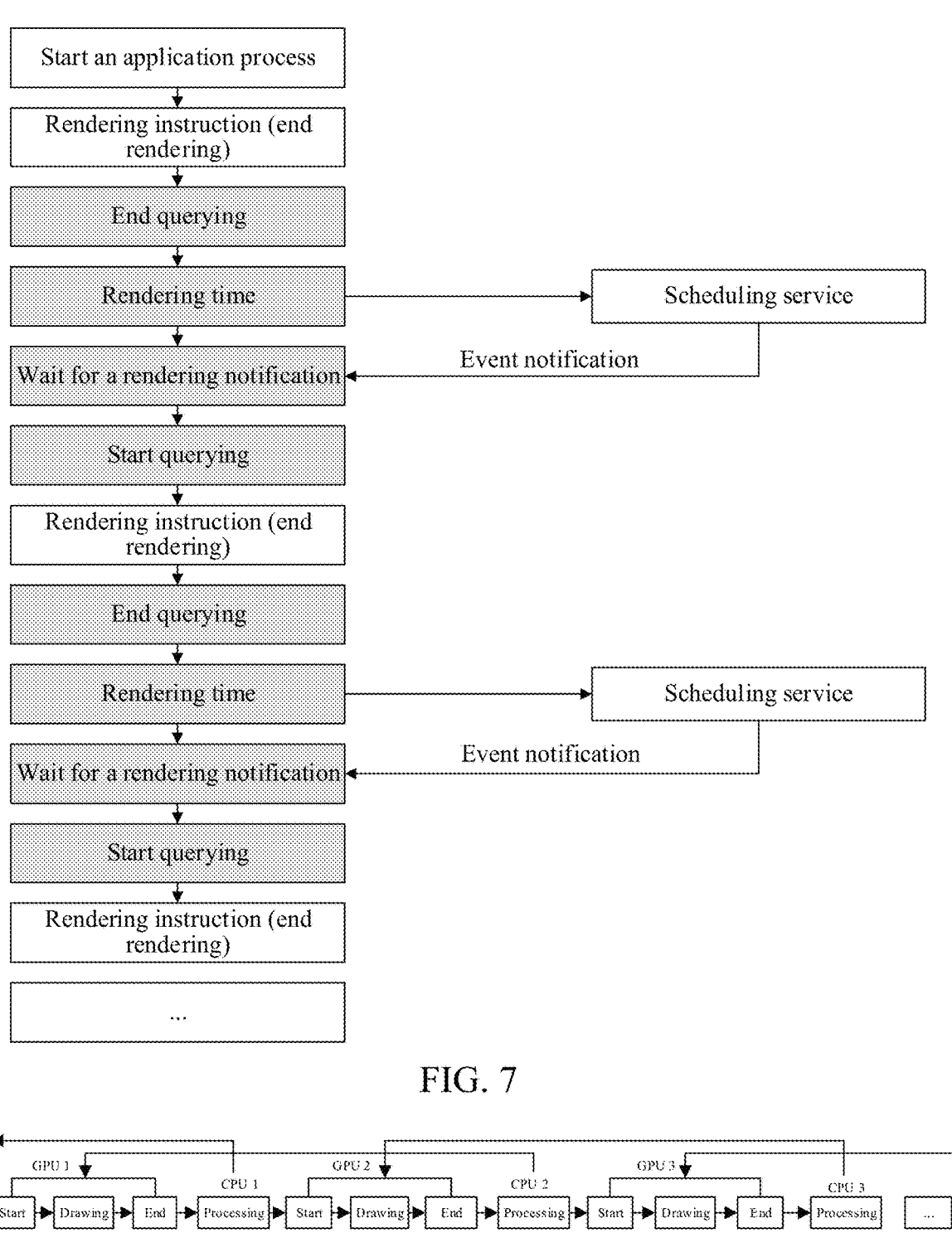
FIG. 7 shows a schematic diagram of obtaining and processing a first increment according to an embodiment of this disclosure.
FIG. 8A is a schematic diagram of a double buffering method of a central processing unit (CPU) and a GPU when determining a first increment according to an embodiment of this disclosure.
FIG. 8B is a schematic diagram of an adaptive buffering method of a CPU and a GPU when determining a first increment according to an embodiment of this disclosure.

FIG. 7 shows a schematic diagram of obtaining and processing a first increment according to an embodiment of this disclosure.

In a case of synchronous rendering, a query operation may be transmitted to the GPU by querying. The query operation may determine time between two specified query points through the GPU. As shown in FIG. 7, "start querying" and "end querying" are two specified query points inserted in the GPU, so as to query GPU time, namely rendering time, taken to perform the rendering function of the rendering instruction therebetween. The first "end querying" point inserted discards the query because the insertion position of the corresponding "start querying" point is not determined. The gray box part in FIG. 7 represents performing GPU resource management processing based on the obtained rendering time, namely, notifying the scheduling service of the obtained rendering time and then waiting for the scheduling service to notify rendering, and performing rendering time processing by the scheduling service and transmitting a rendering notification (namely, a resource allocation command) to the application process in an event notification manner.

In the rendering time query operation as described above, since the operation of waiting for the query time is a synchronous operation on the CPU side, the waiting process of obtaining the rendering time may greatly affect the performance of the application. Therefore, the GPU resource management method of this disclosure may use the time in which the CPU runs rendering instructions to offset the time in which the GPU prepares query results.

FIG. 8A is a schematic diagram of a double buffering method of a CPU and a GPU when determining a first increment according to an embodiment of this disclosure.

In order to ensure a non-intersection query mechanism in the GPU in which the start point and end point of the query must be included in the non-intersection query or a plurality of start points cannot be inserted in succession, the interactive operation between the CPU and the GPU will be performed in this embodiment in such a way that the GPU is delayed by one calculation. As shown in FIG. 8A, indexes of CPUs and GPUs indicate respective processing orders, where the processing of CPU 2 corresponds to the query time of GPU 1, and the processing of CPU 3 corresponds to the query time of GPU 2. Through such double buffering, the processing performance of the CPU when the CPU waits for query of the GPU is effectively improved. However, since the processing of the CPU may be faster than the GPU, double buffering may still not completely avoid the waiting of the CPU. Therefore, based on the double buffering method, the GPU management method of this disclosure may also solve the foregoing problem based on an adaptive buffering mechanism.

FIG. 8B is a schematic diagram of an adaptive buffering method of a CPU and a GPU when determining a first increment according to an embodiment of this disclosure.

In the adaptive buffering mechanism, the double buffering mechanism may still be used. However, in a case that the previous drawing completion cannot be queried, this query may not be ended until it is determined that the previous drawing must be completed, and multiple drawing invocations may also be performed during this period.

Since the adaptive buffering method extends the number of drawing invocations in query relative to the double buffering method, a single drawing invocation of query is extended into a random number of invocations, and the system accuracy may be reduced when a plurality of application processes are processed simultaneously. This is because there may be cross-rendering between different application processes, and the GPU only reads the time of the current query point and cannot distinguish between different application processes, thus causing inaccurate queries.

Therefore, in order to better control the commission of a rendering instruction queue, a rendering instruction buffer area may be forced to be asynchronously refreshed at the end of the GPU query, which results in a large number of fast drawings that can quickly obtain rendering time results for the GPU without using the adaptive buffering method, but also results in a communication transmission burden. In order to balance system performance and accuracy, interactions in a plurality of application processes are reduced while ensuring communication efficiency. Therefore, the Monte Carlo algorithm, which combines the basic algorithm of the double buffering method with the adaptive algorithm, may be used to obtain a better solution (relative to an optimal solution) in a probabilistic statistics manner. The degradation of the adaptive algorithm to the double buffered basic algorithm may be limited by the number of drawing invocations or the system runtime, where lower values of these parameters may reduce the communication performance and higher values may increase the impact in the plurality of application processes. Therefore, the rationality of the system can be further guaranteed by using the Monte Carlo algorithm.

Figure 9A:
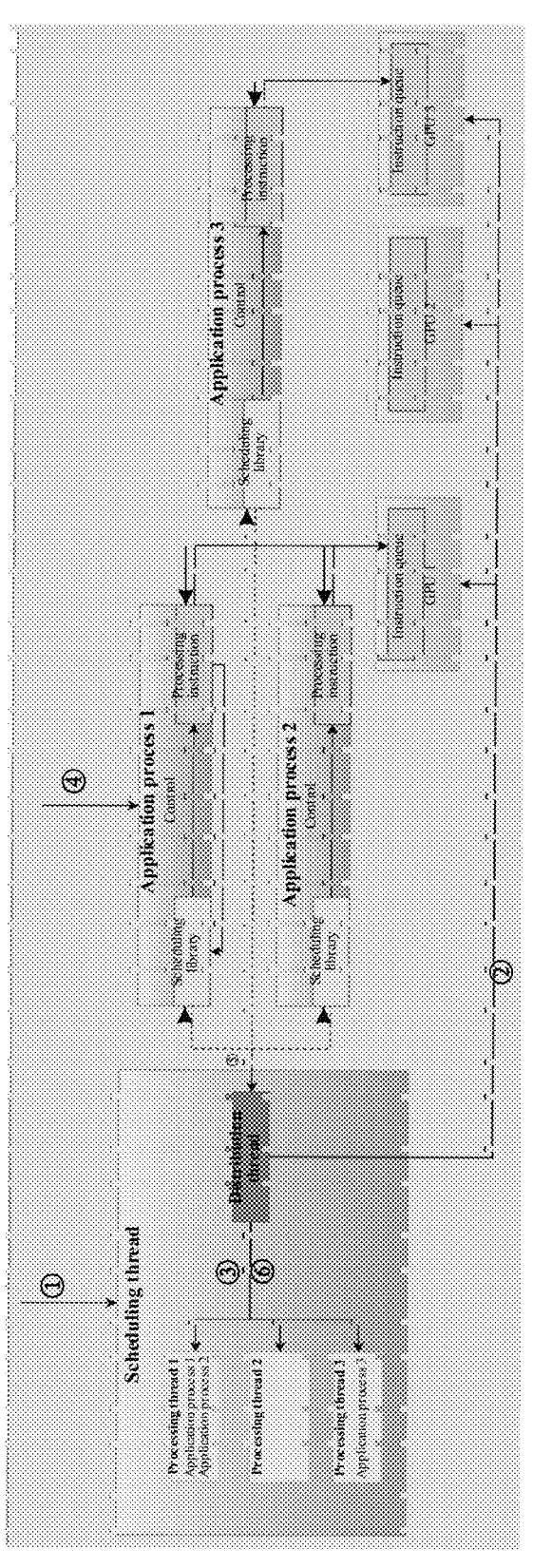
FIG. 9A shows a schematic diagram of a GPU resource management method according to an embodiment of this disclosure.

FIG. 9A shows a schematic diagram of a GPU resource management method 300 according to an embodiment of this disclosure. As shown in FIG. 9A, the GPU resource management method 300 may include two operations performed by a scheduling process and an application process. The GPU resource management method 300 may include the following steps. The numbering of the various steps corresponds to the reference numerals in FIG. 9A.

(1) A scheduling process is started. The scheduling process may include an allocation thread and a plurality of processing threads.

As shown in FIG. 9A, the scheduling process may include one allocation thread and a plurality of processing threads. The allocation thread may be used for allocation of GPUs and application processes and distribution of messages. The processing threads may be used for rendering time processing for the GPUs.

(2) A plurality of GPUs for processing application processes are determined through the allocation thread.

As described above, a plurality of GPUs currently available for processing application processes may be determined for subsequent resource allocation management for each GPU.

(3) One processing thread is allocated to each GPU in the plurality of GPUs.

As shown in FIG. 9A, for the currently determined three available GPUs, the scheduling process may allocate three processing threads 1, 2, and 3 for rendering time processing of the three GPUs. Therefore, the subsequent resource allocation for each GPU may be performed by the corresponding processing thread.

(4) A plurality of application processes are started. Each application process in the plurality of application processes may include a scheduling library pre-configured by the scheduling process.

The scheduling library may be shared by the plurality of application processes, and information interaction between the application process and the scheduling process may be implemented by the scheduling library. After the application process is started, the scheduling library may transmit information of the application process to the scheduling process for registration. The registration operation of the application process is a synchronization operation. In order to reduce the backflow of data, the application process may continue to transmit messages after registration, while the scheduling process may inform the processing of the application process in an event sharing manner.

(5) For each application process in the plurality of application processes, one GPU in the plurality of GPUs and the processing thread corresponding to the GPU are allocated to each application process in the plurality of application processes through the scheduling library of the application process and the allocation thread.

As shown in FIG. 9A, three application processes may be allocated with GPUs for graphics rendering processing. For example, application processes 1 and 2 are allocated for graphics rendering on GPU 1, application process 3 is allocated for graphics rendering on GPU 3, and GPU 2 is not allocated for processing the three application processes. After the registration operation of the application process is completed on the scheduling process, the corresponding registration information may be returned to each application process, such as information of an index of the allocated GPU and the corresponding processing thread thereof.

(6) For each application process in at least one application process allocated to one GPU, a quantity of remaining available resources for the application process in current predetermined resources of the GPU is determined through the processing thread corresponding to the application process, so as to determine a resource allocation command for the application process. The resource allocation command indicates whether to process the application process.

The rendering processing operation of the scheduling service as described above may be performed by the corresponding processing thread in the scheduling process. For example, processing thread 1 corresponding to GPU 1 may process the rendering time of application processes 1 and 2, including determining quantities of remaining available resources for the two application processes in the current predetermined resources and determining corresponding resource allocation commands based on the quantities of remaining available resources for the two application processes in the current predetermined resources. After receiving the corresponding resource allocation command, each application process determines whether to transmit a processing task to the corresponding GPU for processing by the GPU based on the resource allocation command.

As described above, the manner in which the first increment is obtained varies depending on the manner in which the GPU processes the processing task. For example, in a case of asynchronous rendering, the first increment may be estimated by the scheduling library via signal interception directly from the GPU. However, in a case of synchronous rendering, the first increment may be obtained by the scheduling library from the GPU through a query instruction, namely, backtracked along a solid line from the GPU to the scheduling library.

According to this embodiment of this disclosure, the quantity of remaining available resources is associated with a quantity of remaining available resources for the application process in historical predetermined resources of the GPU, and the resource allocation command enables the quantity of remaining available resources for the application process in the current predetermined resources to reach a preset target value. By enabling the quantity of remaining available resources for the application process in the current predetermined resources to reach the preset target value as described above, the quantity of resources used by the application process in the current predetermined resources is closer to an expected quantity of resources, namely, a resource requirement quantity corresponding to a resource requirement weight thereof. Therefore, on-demand resource allocation to application processes and efficient utilization of GPU resources can be achieved.

Figure 9B:
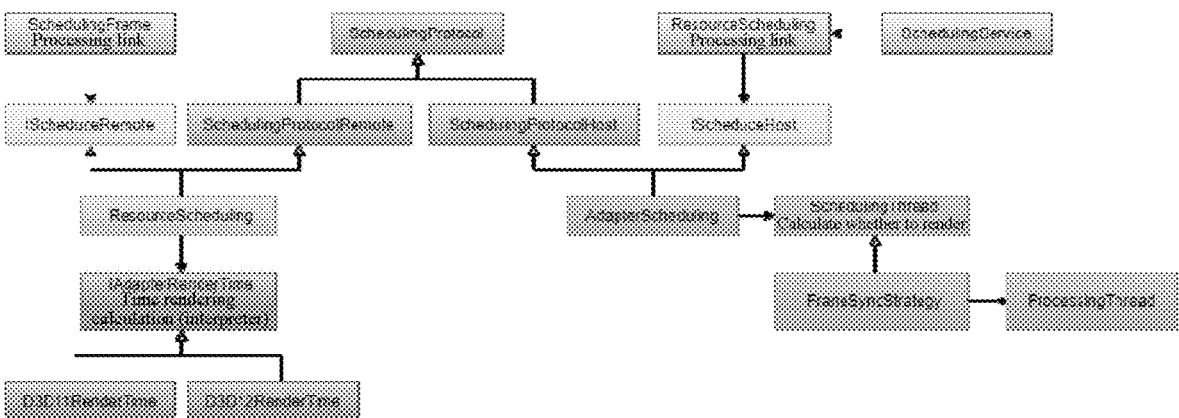
FIG. 9B shows a schematic diagram of scheduling logic of a GPU resource management method according to an embodiment of this disclosure.

FIG. 9B shows a schematic diagram of scheduling logic of a GPU resource management method according to an embodiment of this disclosure. The GPU resource management method of this disclosure may, based on the current design of a common graphics system, involve three runtime libraries: SchedulingClient, SchedulingService, and Scheduling. SchedulingClient and SchedulingService only process a manner in which function injection communicates with external events, and the core logic lies in Scheduling. As shown in FIG. 9B, various functions (for example, ResourceScheduling, SchedulingProtocol, and the like) in FIG. 9B may be invoked to determine resource allocation commands for various application processes by collecting and calculating rendering time and calculating whether to render based on the rendering time.

Figure 10:
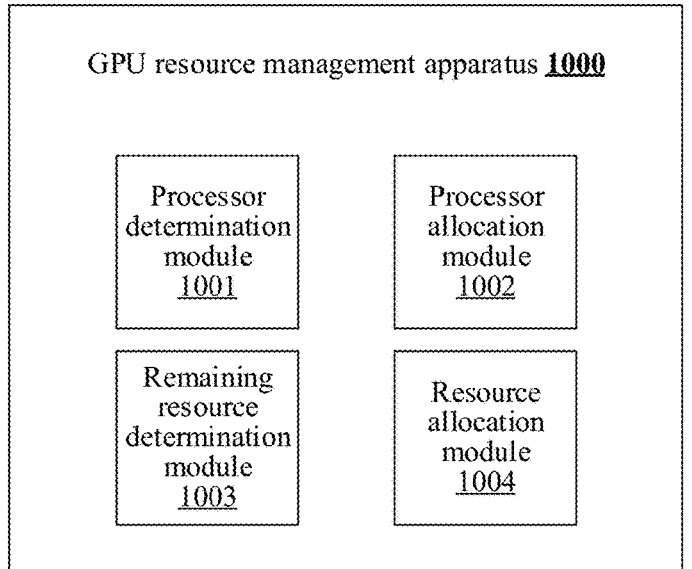
FIG. 10 shows a schematic diagram of a GPU resource management apparatus according to an embodiment of this disclosure.

FIG. 10 shows a schematic diagram of a GPU resource management apparatus 1000 according to an embodiment of this disclosure.

The GPU resource management apparatus 1000 may include a processor determination module 1001, a processor allocation module 1002, a remaining resource determination module 1003, and a resource allocation module 1004.

According to this embodiment of this disclosure, the processor determination module 1001 may be configured to determine a plurality of GPUs for processing application processes.

The processor determination module 1001 may perform the operations described above for step S201.

The application processes may be various application processes such as a game process, a video process, and a conference process. Correspondingly, a GPU determined for a graphics rendering task of an application process such as a game instance is required to be a GPU having a certain rendering computation capability.

The processor allocation module 1002 may be configured to obtain a plurality of to-be-processed application processes, and allocate one GPU from the plurality of GPUs to each application process in the plurality of application processes.

The processor allocation module 1002 may perform the operations described above for step S202.

When user terminals start applications, a server may register corresponding application processes for the applications, including allocation of GPUs to the application processes for graphics rendering processing thereof. In a case of ensuring that the computing performance limitations of the GPUs are met, more than one application process may be allocated to the same GPU. That is, processing tasks of more than one application process are executed simultaneously on the same GPU, but loads allocated to the GPU may not exceed the computing performance limitation of the GPU.

The remaining resource determination module 1003 may be configured to determine, for each application process in at least one application process allocated with one GPU, a quantity of remaining available resources for the application process in current predetermined resources of the GPU. The quantity of remaining available resources is associated with a quantity of remaining available resources for the application process in historical predetermined resources of the GPU.

The remaining resource determination module 1003 may perform the operations described above for step S203. By determining the quantity of remaining available resources for the application process in the current predetermined resources based on the quantity of remaining available resources in the historical predetermined resources, a current resource allocation may be adjusted based on an error in a historical resource allocation, so as to reduce or even eliminate the resource allocation error.

The resource allocation module 1004 may be configured to determine a resource allocation command for each application process in the at least one application process based on the quantity of remaining available resources for each application process in the at least one application process in the current predetermined resources. The resource allocation command indicates whether to process the application process. The resource allocation command enables the quantity of remaining available resources for the application process in the current predetermined resources to reach a preset target value.

The resource allocation module 1004 may perform the operations described above for step S204. By enabling the quantity of remaining available resources for the application process in the current predetermined resources to reach the preset target value as described above, the quantity of resources used by the application process in the current predetermined resources is closer to an expected quantity of resources, namely, a resource requirement quantity corresponding to a resource requirement weight thereof. Therefore, on-demand resource allocation to application processes and efficient utilization of GPU resources can be achieved.

In one embodiment, each application process in the plurality of application processes has a predetermined resource requirement weight. The apparatus further includes: a used resource determination module, configured to obtain, for each application process in the at least one application process, a quantity of remaining available resources for the application process in the historical predetermined resources, and determine a quantity of used resources for the application process in the current predetermined resources.

The remaining resource determination module is further configured to determine the quantity of remaining available resources for the application process in the current predetermined resources based on the quantity of remaining available resources for the application process in the historical predetermined resources, the quantity of used resources for the application process in the current predetermined resources, and the resource requirement weight of the application process.

The resource allocation command enables a first error of the application process to be greater than a second error. The first error is an error between the resource requirement weight of the application process and a proportion of resources used by the application process in the historical predetermined resources. The second error is an error between the resource requirement weight of the application process and a proportion of resources used by the application process in the current predetermined resources.

In one embodiment, the resource allocation command indicates whether a corresponding application process transmits a processing task to a corresponding GPU to be processed by the GPU. The processing of the processing task by the GPU corresponds to the use of resources of the GPU by the application process.

The used resource determination module is further configured to determine a first increment of the quantity of used resources for the application process in the current predetermined resources. The first increment corresponds to previous processing of the processing task from the application process by the GPU corresponding to the application process.

In one embodiment, the resource allocation module is further configured to: determine that the resource allocation command for the application process indicates non-processing of the application process in a case that the quantity of remaining available resources for each application process in the at least one application process in the current predetermined resources is not greater than zero; and determine, for other application processes having more than zero remaining available resources in the at least one application process, the resource allocation command for each application process based on a priority of each application process in the other application processes.

In one embodiment, the priority of each application process in the other application processes is associated with a time length in which the application process waits to be processed and a time order in which the latest first increment thereof is determined.

The resource allocation module is further configured to: determine, for each application process in the other application processes, the resource allocation command for each application process based on the time order in which the latest first increment of the application process is determined in the presence of an application process waiting to be processed in a time length satisfying a predetermined condition; and determine, in the absence of the application process waiting to be processed in the time length satisfying the predetermined condition, the resource allocation command for each application process based on the time order in which the latest first increment of each application process in the other application processes is determined.

Figure 11:
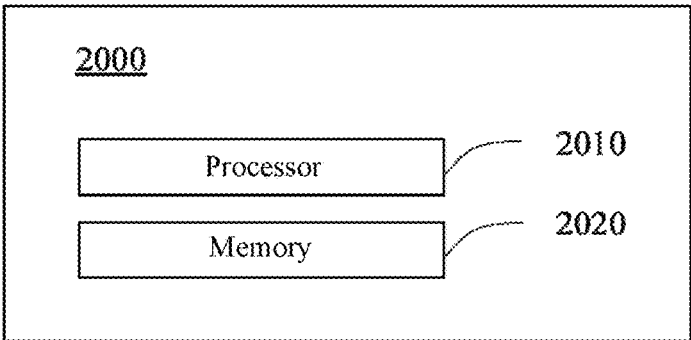
FIG. 11 shows a schematic diagram of a GPU resource management device according to an embodiment of this disclosure.

According to another aspect of this disclosure, a GPU resource management device is further provided. FIG. 11 shows a schematic diagram of a GPU resource management device 2000 according to an embodiment of this disclosure.

As shown in FIG. 11, the GPU resource management device 2000 may include one or more processors 2010 and one or more memories 2020. The memory 2020 stores computer-readable code. The computer-readable code, when executed by the one or more processors 2010, may perform the GPU resource management method as described above.

Processing circuitry, such as a processor, may be an integrated circuit chip and have a signal processing capability. The foregoing processor may be a general purpose processor, a digital signal processor (DSP), an application-specific integrated circuit (ASIC), a field programmable gate array (FPGA), or another programmable logical device, discrete gate or transistor logical device, or discrete hardware component. The methods, the steps, and the logic block diagrams disclosed in embodiments of this disclosure may be implemented or performed by the processing circuitry. The general purpose processor may be a microprocessor, or the processor may be any conventional processor or the like, and may be an X86 architecture or an ARM architecture.

In general, the exemplary embodiments of this disclosure may be implemented in hardware or special purpose circuits, software, firmware, logic, or any combination thereof. Some aspects may be implemented in hardware, while other aspects may be implemented in firmware or software which may be executed by a controller, a microprocessor, or another computing device. While the aspects of this embodiment of this disclosure are illustrated or described as block diagrams, flowcharts, or using some other graphic representations, it will be understood that the blocks, apparatus, systems, technologies, or methods described herein may be implemented in, as non-limiting examples, hardware, software, firmware, special purpose circuits or logic, general purpose hardware or controller or other computing devices, or some combinations thereof.

Figure 12:
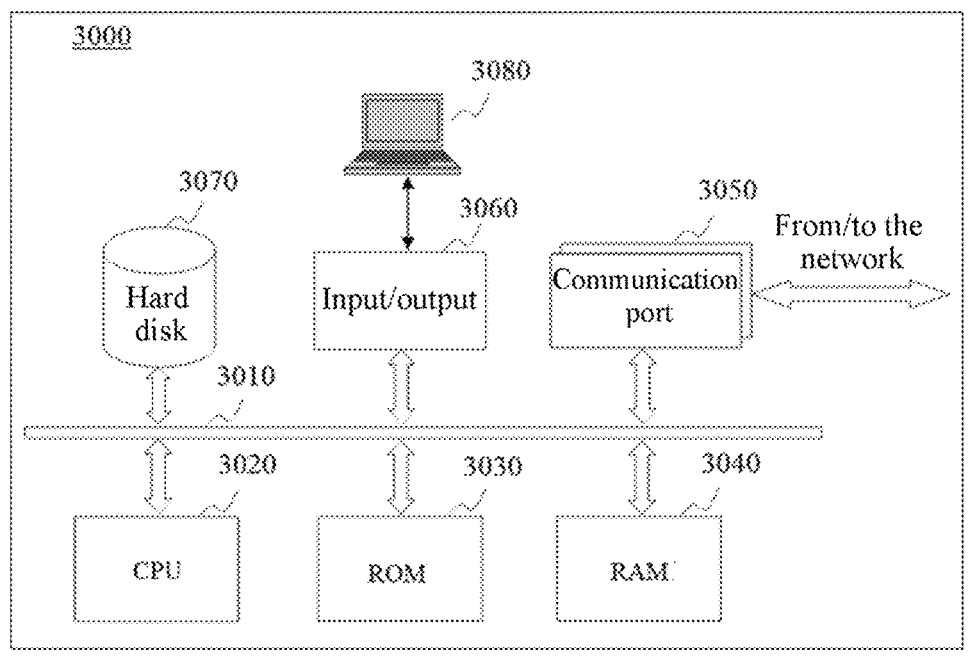
FIG. 12 shows a schematic architectural diagram of an exemplary computing device according to an embodiment of this disclosure.

For example, the method or apparatus according to this embodiment of this disclosure may also be implemented by the architecture of a computing device 3000 shown in FIG. 12. As shown in FIG. 12, the computing device 3000 may include a bus 3010, one or more CPUs 3020, a read only memory (ROM) 3030, a random access memory (RAM) 3040, a communication port 3050 connected to a network, an input/output component 3060, a hard disk 3070, and the like. A storage device in the computing device 3000, such as the ROM 3030 or the hard disk 3070, may store various data or files used in the processing and/or communication of the GPU resource management method provided in this disclosure, as well as program instructions executed by the CPU. The computing device 3000 may further include a user interface 3080. The architecture shown in FIG. 11 is merely exemplary. One or more components of the computing device shown in FIG. 12 may be omitted when implementing different devices.

Figure 13:
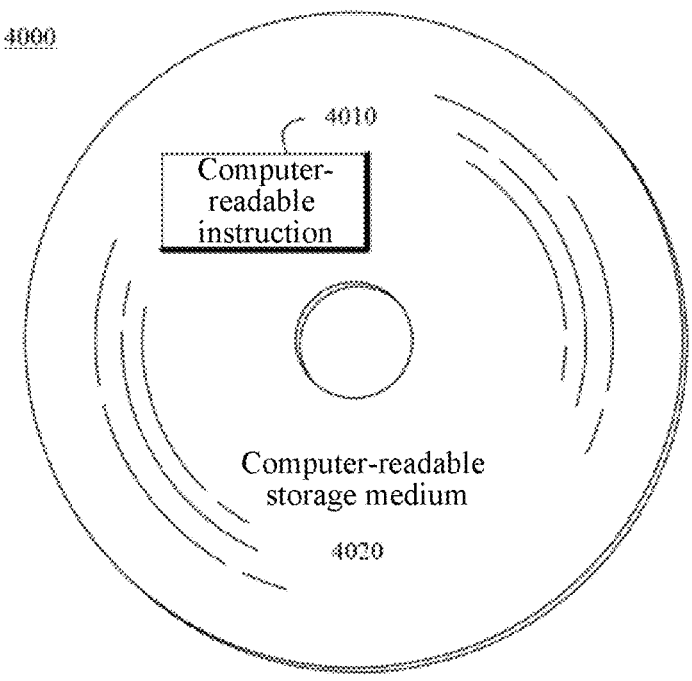
FIG. 13 shows a schematic diagram of a storage medium according to an embodiment of this disclosure.

According to yet another aspect of this disclosure, a computer-readable storage medium, such as a non-transitory computer-readable storage medium, is further provided. FIG. 13 shows a schematic diagram 4000 of a storage medium according to this disclosure.

As shown in FIG. 13, the computer storage medium 4020 stores computer-readable instructions 4010. The computer-readable instructions 4010, when executed by a processor, may perform the GPU resource management method according to this embodiment of this disclosure described with reference to the above accompanying drawings. The computer-readable storage medium in this embodiment of this disclosure may be a volatile memory or a non-volatile memory, or may include both a volatile memory and a non-volatile memory. The non-volatile memory may include a ROM, a programmable read only memory (PROM), an electrically programmable read only memory (EPROM), an electrically erasable programmable read only memory (EEPROM), or a flash memory. The volatile memory may be a RAM serving as an external cache. Through illustrative but not limited description, RAMs in many forms, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synch link dynamic random access memory (SLDRAM), and a direct rambus random access memory (DRRAM), are available. The memory in the method described in this disclosure includes, but is not limited to these memories and any other suitable types. The memory in the method described in this disclosure includes, but is not limited to these memories and any other suitable types.

This embodiment of this disclosure also provides a computer program product or a computer program. The computer program product or the computer program includes computer instructions. The computer instructions are stored in a computer-readable storage medium. A processor of a computer device reads the computer instructions from the computer-readable storage medium. The processor executes the computer instructions, whereby the computer device performs the GPU resource management method according to this embodiment of this disclosure.

This embodiment of this disclosure provides a GPU resource management method, apparatus, and device, a computer-readable storage medium, and a computer program product.

Compared with a related GPU resource management method, the method provided in this embodiment of this disclosure uses resource consumption of an application process running on a GPU in the past as a reference for resource allocation, so as to adjust resource allocation in real time according to a quantity of resources actually available to each application process, thereby avoiding resource contention in a plurality of application processes.

According to the method provided in this embodiment of this disclosure, in view of remaining available resources of application processes simultaneously running on the same GPU in historical resource allocation, a resource allocation scheme is determined in real time based on a quantity of resources currently available for the application processes in resources of the GPU, so as to realize efficient allocation of graphics manager resources. By using the method provided herein, GPU resources can be reasonably allocated according to resource requirements of application processes, thereby avoiding the influence of contention in multiple application processes, and improving the utilization rate of the GPU resources.

The flowcharts and block diagrams in the accompanying drawings illustrate possible system architectures, functions and operations that may be implemented by a system, a method, and a computer program product according to various embodiments of this disclosure. In this regard, each box in a flowchart or a block diagram may represent a module, a program segment, or a part of code. The module, the program segment, or the part of code includes at least one executable instruction used for implementing specified logic functions. In some alternative implementations, the functions labeled in the blocks may occur out of the order labeled in the accompanying drawings. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The exemplary embodiments of this disclosure may be implemented in hardware or special purpose circuits, software, firmware, logic, or any combination thereof. Some aspects may be implemented in hardware, while other aspects may be implemented in firmware or software which may be executed by a controller, a microprocessor, or another computing device. While the aspects of this embodiment of this disclosure are illustrated or described as block diagrams, flowcharts, or using some other graphic representations, it will be understood that the blocks, apparatus, systems, technologies, or methods described herein may be implemented in, as non-limiting examples, hardware, software, firmware, special purpose circuits or logic, general purpose hardware or controller or other computing devices, or some combinations thereof.

The exemplary embodiments of this disclosure described in detail above are illustrative only and are not limiting. It will be appreciated by those skilled in the art that various modifications and combinations of the embodiments or features thereof may be made without departing from the principles and spirit of this disclosure, and that such modifications are intended to be within the scope of this disclosure.

What is claimed is:

1. A method for resource management, the method comprising:
  allocating a processor to the plurality of one or more application processes;
  registering, by processing circuitry executing a scheduling process and for each of the one or more application processes, a respective resource requirement weight;
  obtaining, for each of the one or more application processes and from a previous resource usage, a quantity of remaining available resources of the processor for the respective application process based on an initial resource allocation allocated by the resource requirement weight of the respective application process;
  determining, by the processing circuitry for each of the one or more application processes, a quantity of remaining available resources of the processor for the respective application process in a current resource allocation based on a resource allocation error determined according to the respective quantity of remaining available resources of the processor from the previous resource usage; and
  processing, for each of the one or more application processes, a respective resource allocation command based on the quantity of remaining available resources of the processor for the respective application process in the current resource allocation.

2. The method according to claim 1, wherein the processor includes a graphics processing unit (GPU).

3. The method according to claim 1, wherein the determining, for each of the one or more application processes, the quantity of remaining available resources in the current resource allocation is based on:
  a first error between the resource requirement weight of the respective application process and a proportion of resources corresponding to the quantity of the remaining available resources of the processor for the respective application process from the previous resource usage,
  a second error between the resource requirement weight of the respective application process and a proportion of resources corresponding to the quantity of the remaining available resources of the processor for the respective application process in the current resource allocation, and
  the first error being greater than the second error.

4. The method according to claim 3, wherein
the resource requirement weight of each of the one or more application processes indicates a proportion of a required resource quantity of the respective application process, and
the allocating the processor includes:
  determining an available resource proportion of each of a plurality of processors, the available resource proportion being a proportion of resources available for processing in the respective processor; and
  determining the processor from the plurality of processors to be allocated to the one or more application processes based on the resource requirement weight of each of the one or more application processes and the available resource proportions of the plurality of processors, a sum of the resource requirement weights of the one or more application processes to which the processor is allocated being not greater than the available resource proportion of the processor.

5. The method according to claim 3, wherein
the resource allocation command indicates whether a corresponding application process of the one or more application processes is arranged to transmit a processing task to be processed by the processor, the processing of the processing task by the processor corresponding to use of resources of the processor by the corresponding application process;
the determining the quantity of the remaining available resources for the respective application process in the current resource allocation includes determining a first increment corresponding to previous processing of the processing task from the respective application process by the processor.

6. The method according to claim 5, wherein the determining the first increment comprises:
  determining the first increment based on a processing type of the processing task by the processor, the processing type being at least one of synchronous rendering or asynchronous rendering.

7. The method according to claim 6, wherein the determining the first increment comprises:
  determining the first increment by marking a start and an end of the previous processing when the processing type is the asynchronous rendering.

8. The method according to claim 6, wherein the determining the first increment comprises:
  obtaining the first increment from the processor by using a query instruction when the processing type is the synchronous rendering.

9. The method according to claim 5, wherein the processing, for each of the one or more application processes, the respective resource allocation command comprises:
  determining that the resource allocation command for a first application process of the one or more application processes indicates non-processing of the first application process when the quantity of remaining available resources for the first application process in the current resource allocation is not greater than zero; and
  determining, for each of the one or more application processes having more than zero remaining available resources in the current resource allocation, the resource allocation command for the respective application process based on a priority of each of the one or more application processes having more than zero remaining available resources in the current resource allocation.

10. The method according to claim 9, wherein
the priority of each of the one or more application
processes having more than zero remaining available
resources in the current resource allocation is associ-
ated with a time length in which the respective appli-
cation process waits to be processed and a time order in
which a latest first increment thereof is determined, and
the determining the resource allocation command for the
respective application process based on the priority of
each of the one or more application processes includes:
determining the resource allocation command for the
respective application process based on the time
order in which a latest first increment of the respec-
tive application process is determined in a presence
of an application process waiting to be processed in
a time length satisfying a predetermined condition;
and
determining, in an absence of the application process
waiting to be processed in the time length satisfying
the predetermined condition, the resource allocation
command for the respective application process
based on the time order in which the latest first
increment of the respective application process is
determined.

11. A non-transitory computer-readable storage medium,
storing instructions which when executed by processing
circuitry cause the processing circuitry to perform the
method according to claim 1.

12. A method for resource management, the method
comprising:
starting a scheduling process, the scheduling process
including an allocation thread and a plurality of pro-
cessing threads corresponding to a plurality of appli-
cation processors;
starting a plurality of application processes, each of the
plurality of application processes including a schedul-
ing library pre-configured by the scheduling process;
allocating, for each of the plurality of application pro-
cesses, one processor in the plurality of processors and
the processing thread corresponding to the one proces-
sor to the respective application process through the
scheduling library of the respective application process
and the allocation thread;
registering, via the scheduling process and for each of the
plurality of application processes, a respective resource
requirement weight;
obtaining, for each of the plurality of application pro-
cesses and from a previous resource usage, a quantity
of remaining available resources of the corresponding
processor for the respective application process based
on an initial resource allocation allocated by the
resource requirement weight of the respective applica-
tion process;
determining, for each of the plurality of application pro-
cesses, a quantity of remaining available resources of
the corresponding processor for the respective applica-
tion process in a current resource allocation based on a
resource allocation error determined according to the
respective quantity of remaining available resources of
the processor from the previous resource usage; and
processing, for each of the plurality of application pro-
cesses, a respective resource allocation command based
on the quantity of remaining available resources for the
respective application process in the current resource
allocation.

13. The method according to claim 12, wherein the
plurality of processors includes a graphics processing unit
(GPU).

14. A non-transitory computer-readable storage medium,
storing instructions which when executed by a processing
circuitry cause the processing circuitry to perform the
method according to claim 12.

15. A resource management apparatus, comprising:
processing circuitry configured to:
allocate a processor to one or more application pro-
cesses;
register, by executing a scheduling process and for each
of the one or more application processes, a respec-
tive resource requirement weight;
obtain, for each of the one or more application pro-
cesses and from a previous resource usage, a quan-
tity of remaining available resources of the processor
for the respective application process based on an
initial resource allocation allocated by the resource
requirement weight of the respective application
process;
determine, for each of the one or more application
processes, a quantity of remaining available
resources of the processor for the respective appli-
cation process in a current resource allocation based
on a resource allocation error determined according
to the respective quantity of remaining available
resources of the processor from the previous
resource usage; and
process, for each of the one or more application pro-
cesses, a respective resource allocation command
based on the quantity of remaining available
resources of the processor for the respective appli-
cation process in the current resource allocation.

16. The resource management apparatus according to
claim 15, wherein the processor includes a graphics pro-
cessing unit (GPU).

17. The resource management apparatus according to
claim 15, wherein the quantity of remaining available
resources in the current resource allocation for each of the
one or more application processes is determined based on:
a first error between the resource requirement weight of
the respective application process and a proportion of
resources corresponding to the quantity of the remain-
ing available resources of the processor for the respec-
tive application process from the previous resource
usage,
a second error between the resource requirement weight
of the respective application process and a proportion
of resources corresponding to the quantity of the
remaining available resources of the processor for the
respective application process in the current resource
allocation, and
the first error being greater than the second error.

18. The resource management apparatus according to
claim 17, wherein
the resource requirement weight of each of the one or
more application processes indicates a proportion of a
required resource quantity of the respective application
process, and
the processing circuitry is configured to:
determine an available resource proportion of each of a
plurality of processors, the available resource pro-
portion being a proportion of resources available for
processing in the respective processor; and
determine the processor from the plurality of proces-
sors to be allocated to the one or more application processes based on the resource requirement weight of each of the one or more application processes and the available resource proportions of the plurality of processors, a sum of the resource requirement weights of the one or more application processes to which the processor is allocated being not greater than the available resource proportion of the processor.

19. The resource management apparatus according to claim 17, wherein the resource allocation command indicates whether a corresponding application process of the one or more application processes is arranged to transmit a processing task to be processed by the processor, the processing of the processing task by the processor corresponding to use of resources of the processor by the corresponding application process, and to determine the quantity of the remaining available resources for the respective application process in the current resource allocation, the processing circuitry is configured to determine a first increment corresponding to previous processing of the processing task from the respective application process by the processor.

20. The resource management apparatus according to claim 19, wherein the processing circuitry is configured to:

determine the first increment based on a processing type of the processing task by the processor, the processing type being at least one of synchronous rendering or asynchronous rendering.

* * * * *